United States Patent [19]

Schmidt et al.

[11] Patent Number: 5,322,398
[45] Date of Patent: Jun. 21, 1994

[54] TOOLS FOR MACHINING BORES

[75] Inventors: Hermann Schmidt, Reutlingen; Dieter Aulich, Gomaringen; Peter Essig, Reutlingen, all of Fed. Rep. of Germany

[73] Assignee: Robert Bosch GmbH, Stuttgart, Fed. Rep. of Germany

[21] Appl. No.: 867,108

[22] PCT Filed: Dec. 22, 1990

[86] PCT No.: PCT/DE90/00987
§ 371 Date: Jun. 29, 1992
§ 102(e) Date: Jun. 29, 1992

[87] PCT Pub. No.: WO91/10527
PCT Pub. Date: Jul. 25, 1991

[30] Foreign Application Priority Data

Jan. 9, 1990 [DE] Fed. Rep. of Germany ....... 4000402

[51] Int. Cl.$^5$ ...................... B23B 51/10; B24D 17/00
[52] U.S. Cl. .................................. 408/145; 408/227; 408/714
[58] Field of Search .................. 408/145, 227, 714

[56] References Cited

U.S. PATENT DOCUMENTS

| 450,323 | 4/1891 | Tomlinson | 408/714 |
|---|---|---|---|
| 1,126,961 | 2/1915 | Denney | 408/714 |
| 1,786,520 | 12/1930 | Darling | |
| 2,732,612 | 1/1956 | Hallock | 408/227 |
| 3,076,254 | 2/1963 | Ricci | 408/200 |
| 5,158,405 | 10/1992 | Serafin | 408/1 R |

FOREIGN PATENT DOCUMENTS

| 3333499 | 4/1985 | Fed. Rep. of Germany. | |
| 3517147 | 11/1986 | Fed. Rep. of Germany. | |
| 0207703 | 10/1985 | Japan | 408/145 |
| 261657 | 8/1949 | Switzerland. | |

Primary Examiner—Mark Rosenbaum
Assistant Examiner—John M. Husar
Attorney, Agent, or Firm—Michael J. Striker

[57] ABSTRACT

The tool for machining bore transitions includes a holder drivable rotatably through at least one rotation, and drivable in an advance stroke and in a return stroke; and a spring wire having at least two resilient arms with overlapping movable free end, the spring wire being bent into a hairpin shape so as to have a stem or bent end portion structured to be inserted and held in the holder and a cutting medium provided on the free ends of the resilient arms for machining the bore transitions. The holder can advantageously be provided with a slot for the stem, threaded bolts which engage between the resilient arms of the spring wire and a spring which spring-loads the side of the spring wire inserted in the slot.

11 Claims, 1 Drawing Sheet

TOOLS FOR MACHINING BORES

BACKGROUND OF THE INVENTION

The present invention relates to a tool for machining bores.

More particularly, it relates to a tool for machining bore transitions, which has a stem adapted to be clamped in a drive member in order to execute an advance of the tool through the bore in the working position, a return stroke and an at least a rotational working movement of the tool, with a cutting part at its end adjustable against the force of a spring.

Tools of the above mentioned general type are known in the art.

A tool of this kind, which is known from German Offenlegungsschrift 3333499 is a deburring tool or a tool for forming a chamfer at the transition from a transverse bore to a longitudinal bore. The tool has a finger-shaped cutting tool which is intended for chip-removing machining and which is pivoted outwards in the radial direction about a pivot axis, against the force of a spring, by a pivoting device and through an adjustment movement made by said device. In its rotation it turns a chamfer at the transition edge between the transverse bore and the longitudinal bore. Tools of this kind are provided and suitable for forming relatively large chamfers when the exact geometrical shape of the edge of a bore leading into another bore is not important. Since the transition between a transverse bore and a longitudinal bore lies in a curved and not a flat plane, while the turning movement of the tool occurs only in a flat plane, the thickness of the chamfer varies in size. Therefore transitions machined in this way cannot be made when there are special requirements in respect of control edge shapes.

SUMMARY OF THE INVENTION

Accordingly, it is an object of the present invention to provide a tool for machining bores, which avoids the disadvantages of the prior art.

In keeping with these objects and with others which will become apparent hereinafter, one feature of the present invention resides, briefly stated, in a tool of the above mentioned type, in which the cutting part is disposed on at least two resilient arms forming at least a part of the stem.

When the tool is designed in accordance with the present invention, with the aid of such tool the transition edges of a transverse bore which leads into a longitudinal bore can be machined in such a manner that uniform removal of material is achieved substantially over the entire periphery of the edge, so that a burr formed there by machining processes is removed without undesirable rounding occurring. Such burrs occur even when, after accurate production of the longitudinal and transverse bores followed by the hardening of the parts, the longitudinal bore, for example, is subjected to high precision honing to guide an injection pump piston. Burrs of considerable size then project into the transverse bore and, if they break off, may give rise to the malfunctioning of an injection pump. In this connection it should be noted that the pump pistons are guided in the longitudinal bore with a high precision fit and move sealingly against pressures of for example 1000 bars. Particles of material such as broken-off burrs have here a very considerable effect on the operating reliability of the pump piston guide. It is therefore a requirement that such burrs should be removed. With the aid of the tool according to the invention this can be done in the desired manner.

In accordance with another new feature of the present invention the resilient arms are formed by a spring wire bent into hairpin shape, and the cutting part is composed of ends of the spring wire which are bent in the shape of a head, which are movable in such a manner as to overlap each other resiliently and are coated with a cutting medium. When the tool is designed in accordance with these features, it has a particularly advantageous construction with a wire, through the use of which a large range of bore diameters can be machined. This embodiment is particularly easily adapted to a transverse bore transition edge lying in a curved plane, with easy insertability through the transverse bore. In an advantageous manner the machining is effected gently and without causing undesirable rounding of the edge.

In accordance with still another feature of the present invention, on its side remote from the curved ends, the spring wire bent into hairpin shape is inserted by its end bent into a hairpin shape into a slot of a holder adapted to be connected with the drive member, it is there guided by two guide parts engaging between the arms, and is loaded axially outwards by a holding spring supported in the holder. With such a construction, advantageous mounting of the tool in a holder is achieved. The guide parts provide accurate guidance for the tool in the form of spring wire bent in hairpin shape, and in the event of resistance being encountered, as can for example occur when the tool is inserted into a transverse bore, the tool can yield axially in the direction of the spring without being destroyed. The tool is thus suitable for use in automatic machine tools. In such a case it may occur that a deburring tool cannot be brought into position when, as the result of a fault, the bore in question has not been formed in the workpiece or, for example, because of a broken drill the bore which is to be machined is closed off. In such cases the tool according to the invention yields into the stem of the holder on encountering the "obstacle". Still another feature of the present invention is that at the ends projecting into the slot the threaded bolts of the guide parts are provided with spring-loaded balls enabling the spring wire to be inserted into the slot by its bent end. Through these features easy exchangeability of the tool is achieved, since the spring wire bent into the shape of a hairpin can be snapped into position past the yielding balls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
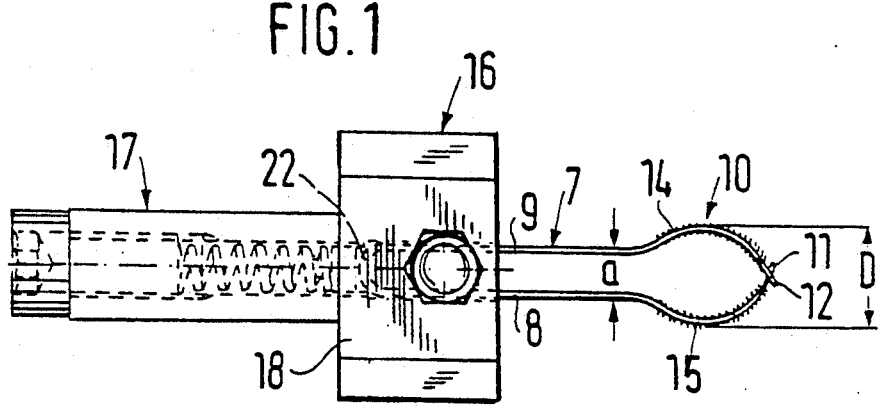
FIG. 1 is a side view of the example of embodiment of the tool according to the invention.

The tool shown in longitudinal section in FIG. 1, is intended for machining transition edges of bores for the removal of burrs formed there by machining operations. It has a stem of spring wire 7 bent into hairpin shape and consisting of two resilient arms 8 and 9 which in the position of rest extend approximately parallel to one another. Their free ends 14, 15 are each curved and circular arc-shaped, so as to form a head-like cutting part 10. The outermost ends 11, 12 of the arms overlap, so that under pressure transversely to the plane in which the arms 8, 9 lie the outermost ends can slide past one another and the largest diameter D of the cutting part 10 can be variously modified. The largest diameter D of the cutting part is at least twice as great as the distance a between the arms 8, 9. The curved free ends 14, 15 of the arms are coated with cutting medium, which may consist of diamond grains embedded in carrier material, as is usually the case with honing strips in honing tools. Other cutting media are however also conceivable.

Figure 2:
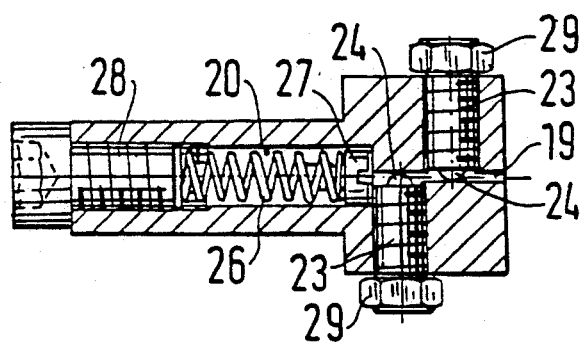
FIG. 2 is a section through the tool holder at right angles to the plane of the drawing in FIG. 1.

The arms 8, 9 of the spring wire 7 form part of the stem 1 which is held in a holder 16. The holder has a mounting stem 17 by means of which the holder can be connected to an appropriate drive member, which is not shown in further detail and may for example be a drilling spindle. The drive member brings the cutting tool with the headlike cutting part 3 into the desired position, and in addition drives the tool rotationally in order to execute the working movement. The holder is provided with a head 18 which adjoins the mounting stem 17 and has an axial slot 19 (see FIG. 2). This slot merges into a bore 20 in the mounting stem 17. The bent end 22 of the spring wire 7 bent into hairpin shape is inserted into the slot 19, and is there fastened by two guide parts, in the form of threaded bolts 23 screwed into the head from the opposite side in each case. On its end projecting into the slot 19 each threaded bolt is provided with a ball 24 which is spring-mounted in the interior of the threaded bolt. It engages between the arms 8 and 9 of the spring wire bent into a hairpin shape and guides said spring wire in the longitudinal direction and axially in relation to the mounting stem.

The bent end 22 of the spring wire 7 is loaded by a compression spring 26. The spring is disposed in the bore 20 and bears against the spring wire with the aid of a pressure member 27. At the opposite end the compression spring is supported on a screw 28, which for example can be adjustably screwed into the mounting stem at the end face of the latter and be secured at the desired depth of penetration, thereby ensuring the prestressing of the compression spring. The threaded bolts are secured in their screwed-in position by locknuts 29 and project from opposite sides into the slot 19 by means of their balls 24, lying one behind the other in the axial direction.

In this arrangement the tool in the form of the spring wire bent into hairpin shape can be inserted into the slot 19 in the holder 16 at the end face of the latter. The bent end 22 snaps past the balls 24 one after the other into the engaged position, thus coming to bear against the pressure member 27. For the machining operation the tool is introduced by means of the holder 16 into the bore which is to be machined. The curved end portions 14, 15 having the shape of parts of a circle yield resiliently inwards in relation to one another until at the end of the bore, or at the transition from the bore to the larger part of the bore or to the longitudinal bore into which the transverse bore leads. They open out resiliently and assume the working position, and thereby come to bear against the transition edge of the transverse bore with a part of their extension having the shape of a part of a circle. At that moment or sooner the tool can be driven rotationally, thereby removing by means of the coated part of the spring wire any burr that may exist on the edge.

If the tool should encounter resistance, it can yield into the interior of the holder against the force of the compression spring and is thus protected against destruction. The great flexibility of the spring wire makes it possible to machine bores of very different diameters. Already with two types of tool, for example, bores within a range of 2 to 4 millimeters can already be machined. The tool adapts itself in optimum manner without excessive contact pressures and lies only at one point or short linear region against the edge which is to be machined. In addition, the tool can be manufactured very inexpensively and can easily be replaced as a wearing part at the end of its useful life. Instead of the rather expensive, if very advantageous, mounting of the tool shown in the drawings, the tool can of course also be clamped fast in a holder with accurate alignment to the axis of the holder. However, because of its very great flexibility the tool can even compensate for slight misalignment. This also makes it possible to machine the most diverse types of transitions of bores, for example also transition edges of blind bores and stepped bores.

It will be understood that each of the elements described above, or two or more together, may also find a useful application in other types of constructions differing from the types described above.

While the invention has been illustrated and described as embodied in a tool for machining bores, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool for machining bore transitions, comprising a holding means drivable rotatably through at least one rotation and drivable in an advance stroke and in a return stroke; at least two resilient arms held in said holding means, each of said at least two resilient arms including a part of a stem clamped in said holding means and a free end remote from said part of said stem, said free end projecting from said holding means; and cutting means provided on said at least two resilient arms.

2. A tool as defined in claim 1, wherein two of said at least two resilient arms are held in said holding means and said two resilient arms held in said holding means are part of a spring wire including said stem.

3. A tool as defined in claim 1, wherein said at least two resilient arms are part of a spring wire, said spring wire is bent into a hairpin shape and forms a head portion comprising said free ends having said cutting means.

4. A tool as defined in claim 3, wherein said free ends of said spring wire have an approximately circular arc shape.

5. A tool as defined in claim 3, wherein said holding means comprises a holder provided with a slot for said spring wire and said stem of said spring wire is inserted in said slot of said holder.

6. A tool as defined in claim 5, wherein said holding means also includes two guide parts engaging between said resilient arms and guiding said stem of said spring wire in said holder.

7. A tool as defined in claim 1, wherein said cutting means comprises a cutting medium coating said at least two resilient arms and consisting of a plurality of diamond grains embedded in a carrier material.

8. A tool for machining bore transitions, comprising a holding means drivable rotatably through at least one rotation and drivable in an advance stroke and in a return stroke; a spring wire bent into a hairpin shape, said spring wire including a stem clamped in said holding means and two resilient arms, said resilient arms extending from said stem and having free ends, said free ends being remote from said stem and projecting from said holding means, said free ends of said spring wire overlapping and being movable relative to each other; and cutting means comprising a cutting medium coating said free ends.

9. A tool for machining bore transitions, comprising a holding means drivable rotatably through at least one rotation and drivable in an advance stroke and in a return stroke; a spring wire bent into a hairpin shape, said spring wire including a stem clamped in said holding means and two resilient arms, said resilient arms extending from said stem and having free ends remote from said stem, said free ends overlapping, being movable relative to each other and projecting out from said holding means; and cutting means provided on said at least two resilient arms, and wherein said holding means includes a holder provided with a slot for holding said stem of said spring wire, two guide parts engaging between said resilient arms and guiding said stem of said spring wire in said holder and a holding spring supported in said holder and spring-loading said stem of said spring wire.

10. A tool as defined in claim 9, wherein said guide parts comprise threaded bolts.

11. A tool as defined in claim 10, wherein each of said threaded bolts has an end projecting to said slot and a spring-loaded ball projecting from said end into said slot so that said spring wire can be inserted into said slot and engaged by said threaded bolts.

* * * * *